United States Patent
Cao et al.

(10) Patent No.: US 7,571,106 B2
(45) Date of Patent: Aug. 4, 2009

(54) METHODS AND APPARATUS FOR FRESHNESS AND COMPLETENESS OF INFORMATION

(75) Inventors: Yu Cao, Monterey Park, CA (US); Leonard Kleinrock, Los Angeles, CA (US)

(73) Assignee: Platformation, Inc., Monterey Park, CA (US)

( * ) Notice: Subject to any disclaimer, the term of this patent is extended or adjusted under 35 U.S.C. 154(b) by 0 days.

(21) Appl. No.: 12/099,343

(22) Filed: Apr. 8, 2008

(65) Prior Publication Data

US 2008/0249877 A1    Oct. 9, 2008

Related U.S. Application Data

(60) Provisional application No. 60/910,800, filed on Apr. 9, 2007.

(51) Int. Cl.
*G06Q 30/00*    (2006.01)
(52) U.S. Cl. .................. 705/1; 705/14; 705/26; 705/27; 705/37; 705/39; 705/40; 705/500; 707/3; 709/213; 717/168; 717/178

(58) Field of Classification Search .................. 705/1, 705/14, 26, 27, 37, 39, 40, 500; 707/3; 709/213; 717/168, 178
See application file for complete search history.

(56) References Cited

U.S. PATENT DOCUMENTS

| 6,618,751 B1 * | 9/2003 | Challenger et al. ......... 709/213 |
| 6,983,272 B2 | 1/2006 | Davis et al. |
| 2003/0225755 A1 * | 12/2003 | Iwayama et al. ............. 707/3 |
| 2004/0024682 A1 | 2/2004 | Popovitch |
| 2004/0254798 A1 | 12/2004 | Hoang |
| 2007/0165608 A1 | 7/2007 | Altberg et al. |

FOREIGN PATENT DOCUMENTS

JP    2002092355 A  *  3/2002

* cited by examiner

*Primary Examiner*—Yogesh C Garg
(74) *Attorney, Agent, or Firm*—Fish & Associates, PC

(57) ABSTRACT

A system that facilitates publishing and consuming information that is of time sensitivity, for example, price information. Methods are employed to achieve completeness and freshness in information for a given domain. A preferred embodiment is a shopping site that is capable of comparing prices, purchasing bundled products and dealing with coupons.

19 Claims, 15 Drawing Sheets

| delay | fee |
|---|---|
| 24 Hours | Free |
| 4 Hours | $1 |
| 30 minutes | $10 |
| 30 seconds | $100 |

| percentile | fee |
|---|---|
| Top 5% | $101 |
| Top 10% | $51 |
| Top 25% | $21 |
| Top 75% | $11 |

Figure 10

| Jumping in queue | fee |
|---|---|
| Forward by 1000 positions | $200 |
| Forward by 100 positions | $50 |
| Backward by 10 positions | $1 |
| Ahead of a named provider | $1000 |

Figure 11

METHODS AND APPARATUS FOR FRESHNESS AND COMPLETENESS OF INFORMATION

CROSS REFERENCE TO RELATED APPLICATIONS

This application claims priority to U.S. provisional application Ser. No. 60/910,800 filed Apr. 9, 2007.

FIELD OF THE INVENTION

The field of the invention is searching technologies.

BACKGROUND

Information retrieval (IR), of which search engines are a prominent embodiment, strives to provide relevant results to satisfy a searcher's information needs. To that end, a first requirement of an IR system is to have a reasonably good, or even complete, coverage of pertinent information, namely information that a searcher might plausibly find relevant. A related requirement is to have information that is as fresh as possible.

With respect to completeness, one of the biggest problems is the vast amount of data available. According to United States Patent Application, 2006/0106792, Patterson, May 18, 2006, the Internet had more than 200 billion pages in early 2005. Of the more than 200 billion web pages, the largest search engines were able to crawl only about 10 billion pages. The large gap between the number of existing Web pages and the amount a search engine can crawl likely will remain large, due to one aspect of how HTML works, namely the absence of a centralized index. With today's growth speed of new pages, it is impractical or even impossible have a complete coverage of the entire Web.

With respect to freshness, one of the biggest problems is that crawling, the prevailing method for a search engine to gather information, introduces delays of up to days if not weeks. In addition, freshness is often dictated by which information is used the most often, not by how valuable freshness might be to the source of the information. For example, U.S. Pat. No. 6,763,362, McKeeth, Jul. 13, 2004, teaches a method for updating information contained in a search engine at least partially based on how often a piece of information is requested by searchers.

Others have addressed repositioning rankings in search result queues for a fee or distributing time sensitive data including U.S. Pat. No. 6,983,272 to Davis et al, U.S. Patent Application 2004/0024682 to Popovitch, U.S. Patent Application 2004/0254798 to Hoang, and U.S. Patent Application 2007/0165608 to Altberg. Although useful for their respective purposes, none of the above references have appreciated that differentially updating time sensitive data according to a fee schedule represents a valuable proposition.

The Patterson and McKeeth applications, along with all other extrinsic materials discussed herein, are incorporated by reference in their entirety. Where a definition or use of a term in an incorporated reference is inconsistent or contrary to the definition of that term provided herein, the definition of that term provider herein applies and the definition of that term in the reference does not apply.

The need for completeness and freshness is especially acute when it comes to dealing with information that is time-sensitive, such as prices of products, availability of in-stock products, arrival/departure information. A step in the right direction is illustrated by two kinds of online businesses. One, web hosting services such as the hosting service offered by Web.com, allows a web site's owner update contents with various monthly plans. This way, a web site's owner can update frequently information deemed time-sensitive. Another business is current comparison shopping sites such as ShopZilla.com, NexTag.com, which allows merchants to feed information to the comparison shopping site several times a day. The information fed is typically that of products and their prices, thus is time-sensitive. However, neither business concerned themselves with completeness of information.

In finding new methods that will lead to both completeness and freshness of information, especially for dealing with information that is time-sensitive, consider a pedagogical example: constructing an information system designed to provide parking information for downtown Santa Monica. On one side of the system, there are "publishers" of information. Typically a publisher is also the owner of a parking space. Information to be published includes but is not restricted to how many slots are available at a parking space, how many cars are looking for a spot, or entering, or leaving. Some other information, however, does not necessarily have an "intrinsic" publisher, for example, street parking spots. On the other side of the system, there are "consumers" of information, who want to utilize the information for their parking needs at the moment (as in a driver in the area with wireless access to the system) or in an anticipated future (as in a driver leaving for the area). In this example, there are two notable aspects of the information in question: (i) it is practical to have a complete coverage of the domain; and (ii) the information changes over time, and its usefulness is highly related to its freshness when it is made accessible by consumers.

What is needed in this and other situations is a new framework for IR systems that addresses both completeness and freshness. A first measure would be confining the "domain" of information so that it can be completely, or near-to-completely, proactively collected ("crawling" when such information is contained on web sites). A second measure is to invite "publishers" (or equivalently, authors, owners, etc.) of information to submit it to IR systems, preferably in a verifiable way. A third measure is to invite objective third party to submit corrections to information existing on IR systems, or to submit new information. A four measure is to allow flexibility in granularity of the "unit" of information (e.g., with search engines, such a unit of information is a web page that's identified by a URL.). With these measures, IR systems can achieve both freshness and completeness for a given domain.

SUMMARY OF THE INVENTION

The present invention includes systems, methods and apparatus in which a shopping or other information website differentially updates time-sensitive data from different data providers according to a fee schedule.

Contemplated embodiments could, for example, ensure that data from different providers could be updated at differing time schedules, such as every five minutes, hourly, daily, weekly, and so forth. In other embodiments data from a given provider could be moved up in an update queue by a given percentage of the queue, or by a given number of tasks, or possibly above tasks associated with a competitor. From another perspective, delays in crawling certain sites, in updating data, or in update queue movements could be intentionally implemented against data providers that are unwilling to pay an update fee. Such delays could effect any suitable time frame, from a seconds, to minutes, hours, days, and so forth.

The order with which refreshing of various data is executed takes on one of many possible forms, such as a first-come-first-served queue, time intervals, jump-to-the-head. A data provider could pay the publishing site according to a fee schedule, so that its data could be updated in a favorable manner. A preferred embodiment of the publishing site is a shopping site (e.g., a site similar to Amazon.com), and a comparison shopping site (e.g., a site similar to ShopZilla.com) in particular. Contemplated comparison shopping sites using the technologies described herein could realistically handle at least 5,000 items, more preferably at least 10,000 or even at least 50,000 items, and appropriate ones of the drawings should be interpreted in that manner.

Data could get into the system in any suitable manner. For example, a publishing site could proactively gather information from Web and non-Web sources, including websites, bulletin boards, forums, and blogs, some of which might be owned by publishers described above. In such cases, the publishing site could advantageously engage in gathering actions (typically a software crawler) directed at portions of Web or non-Web sources according to a set of schedule. Financial incentives might be paid by such a data provider to the publishing site in order to gain a favorable schedule.

Alternatively, a data provider could submit new or updated data to the publishing site; thus these data are "pushed" by data providers to the publishing site. Typically the pushed data would be time-sensitive, such as pricing information. An existing data on the publishing site could be "refreshed" (used interchangeably with "updating" in this writing) when part or even entirety of it is changed, again for example the pricing information of a given product. A piece of data could be refreshed within a minute, hourly, daily, or weekly.

Further, a "human digger", preferably not affiliated with a data provider or the publishing site, is an entity (a person, a company, etc. . . . ) who submits information to the publishing site. A submission could be a correction to information that has been published, or could be a new piece of information. A human digger might be rewarded by the operator of the publishing site.

One embodiment of the invention is a comparison shopping site where price information is extensive (if not 100% complete), fresh and searchable, where data items are focused on price information from vendors of goods and services, and data are searchable. The site might contain data from tens of thousands of vendors, each of which might have tens of thousands of items. A vendor could be in retail, online retail, coupons, rebates, wholesale, travel, health care, real estate and entertainment. A publisher (typically a vendor who operates a web site) typically has an account with the site, and can be authenticated by the site, or alternatively, by a third party.

It is contemplated that at least some of the data could be part of a "bundled combination", i.e., a combination that contains at least two items. An item can be a product or a service. In the domain of shopping, an example of a bundled combination is a digital camera and a memory stick.

Data could also be "generalized coupons". A generalized coupon associates together price, time, individual shopper and individual item for sale, typically serving as an inventive issued by a vendor to one or more potential buyers, for one or more copies of one or more sales items.

It is still further contemplated that a publishing site could auction update frequencies or other parameters. A data provider wishing to join such an auction would typically pay. All forms of auctions are contemplated.

In a similar manner, a schedule for the site's gathering actions (crawling, for example) could be auctioned among publishers.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 10 depicts schematically a fee schedule that associates position percentiles in a queue with fees.

FIG. 11 depicts schematically a fee schedule that associates "jumping" operations on a queue with fees.

DETAILED DESCRIPTION

1. A Method for Freshness and Completeness of Information

Figure 1:
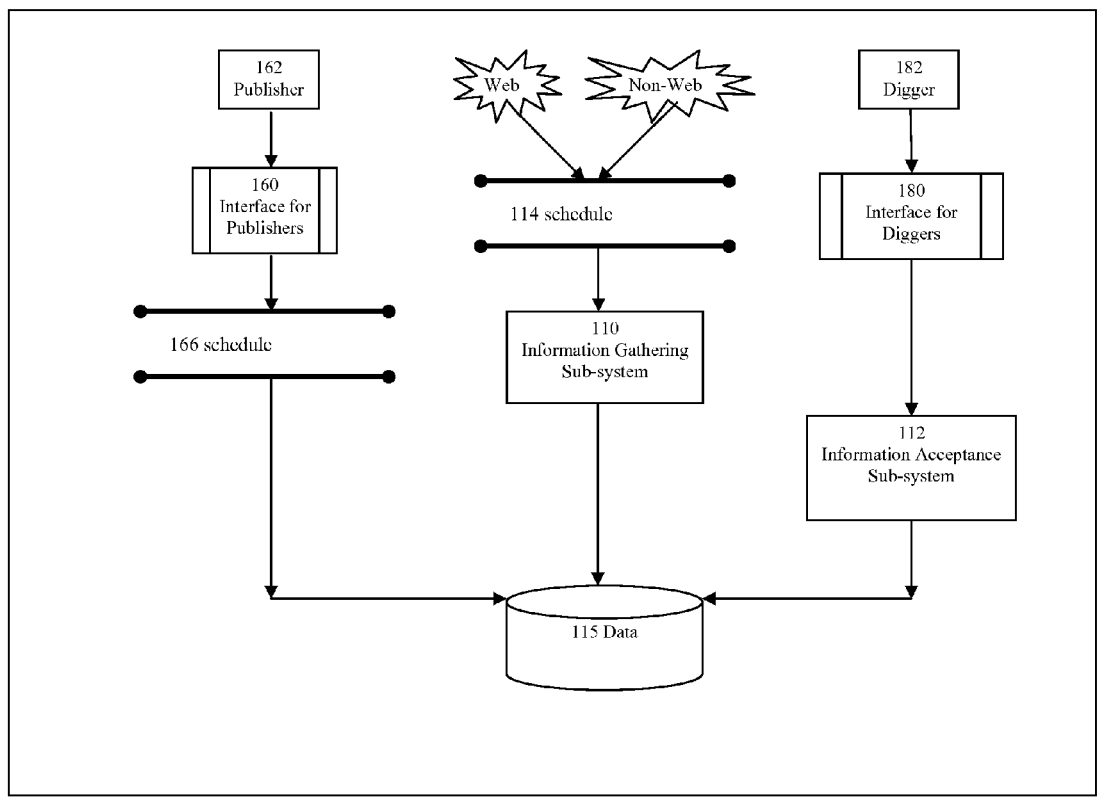
FIG. 1 depicts schematically methods with which information is input and updated with a publishing site.

Refer to FIG. 1, which depicts how information is gathered and updated from multiple data publishers (also known as data providers). A publishing site, an embodiment of this invention, gathers and updates data 115 through three ways: (i) from publishers of data; (ii) by the site itself which proactively crawls data or otherwise gathers data; and (iii) by "human diggers" who gather or update data.

A publisher 162 inputs or updates her data through the interface for publishers 160. A publisher typically is a business that offers products or services, and has a need to publish data on the business, products, services, or others. A publisher could also be an organization, an educational establishment, an association, a group, a forum. Different publishers use different languages. The interface for publisher 160 could be software installed (as a Windows application, for example) on a computer of the publisher; it could also be a web page operated by the publishing site. Authentication of a publisher is performed either by the site or by a cooperating site. One purpose of authentication is to verify that the publisher indeed owns the data that is submitted for input and updates, or otherwise has the rights to submit.

The publisher's data is published according to a fee schedule 166. The fee schedule (in a preferred embodiment, there are a set of schedules) generally indicates which data provider's information is published at what time intervals, and generally decides relative priority among data providers. A financial inventive could be provided by the publisher to the system in order to obtain a schedule that's preferential in publishing; however, it is also contemplated that data of a non-paying data provider is also updated by the publishing site. An update could occur hourly, daily, weekly, or with other frequencies.

The information gathering sub-system 110 gathers information proactively from Web or non-Web sources. Gathered information feeds into "data 115". Nowadays much information exists on the Web in the forms of web sites, forums, blogs, RSS feeds, among others. There is also much information exists in non-Web sources, such as print publications (phone books, trade directories, product catalogues, etc.), non-public databases (corporate intranets, library information systems at universities, etc.). Gathering actions (typically crawling) are carried out at least partially dependent on a fee schedule 114. The schedule (in a preferred embodiment, there are a set of schedules) indicates how often, or at what time, gathering actions are directed to a portion of an information source. The schedule also decides relative priorities among information sources.

A digger 182 (also known as a "human digger") through the interface for diggers 180 to provide the site with information. In general, there is information that is not made available by the providers or by the site: A piece of information might not be something a publisher wants to publish, for example, suppose a restaurant is a publisher, and the restaurant might not want to publish the information that its kitchen is not clean; meanwhile, a piece of information might be missed by the site's gathering actions, for example, much information on the Web is not crawled by any search engines. A human digger typically is not affiliated with a publisher, nor with the site. The fact that a human digger is a third-party entity encourages objective provision of information to the site.

At the interface 180, there are least two actions that a digger can perform:
(i) providing new information, namely information that is not in Data 115. The digger would search for certain information, the site returns no results, and the digger concludes that the site does not have the information, and proceed to input it.
(ii) providing updates to information that is already in data 115. The digger would search for information, the site returns results, and the digger could proceed to update a portion of a piece information. For example, the digger searches for "DSC-T50 at Target", and the site returns a result that contains the information "SONY DSC-T50 at Target, $299". If the digger possesses information that the price is $199 instead, she could update the information so that the site has "SONY DSC-T50 at Target, $199" in its data 115.

Information provided by a digger is accepted by the Information Acceptance Sub-system 112, whose main purpose is to verify whether an input piece of information is truthful. To the extent that a piece of information is verifiable (e.g., information that's published on a web site), the sub-system performs a verification, which is preferably carried out with software, could be in real time, or in a delayed manner such as through email exchanges. A verification could also be performed by a person associated with the site. A piece of information that cannot be verified is typically rejected. A piece of information that is show by this verification step to be wrong is rejected.

A digger is rewarded by the site in various ways, including cash rewards, non-cash rewards. Rewards are dependent on at least on the quantity and quality of new information or updates the digger provides. The quality of a digger's work is partially dependent on its effectiveness in causing actions by visitors to the site who see the information. For example, after a digger's update of "SONY DSC-T50 at Target, $199", if there are verifiable inquiries or purchases by visitors to the site due to this update, the digger would be rewarded accordingly.

2. System 100

Figure 2:
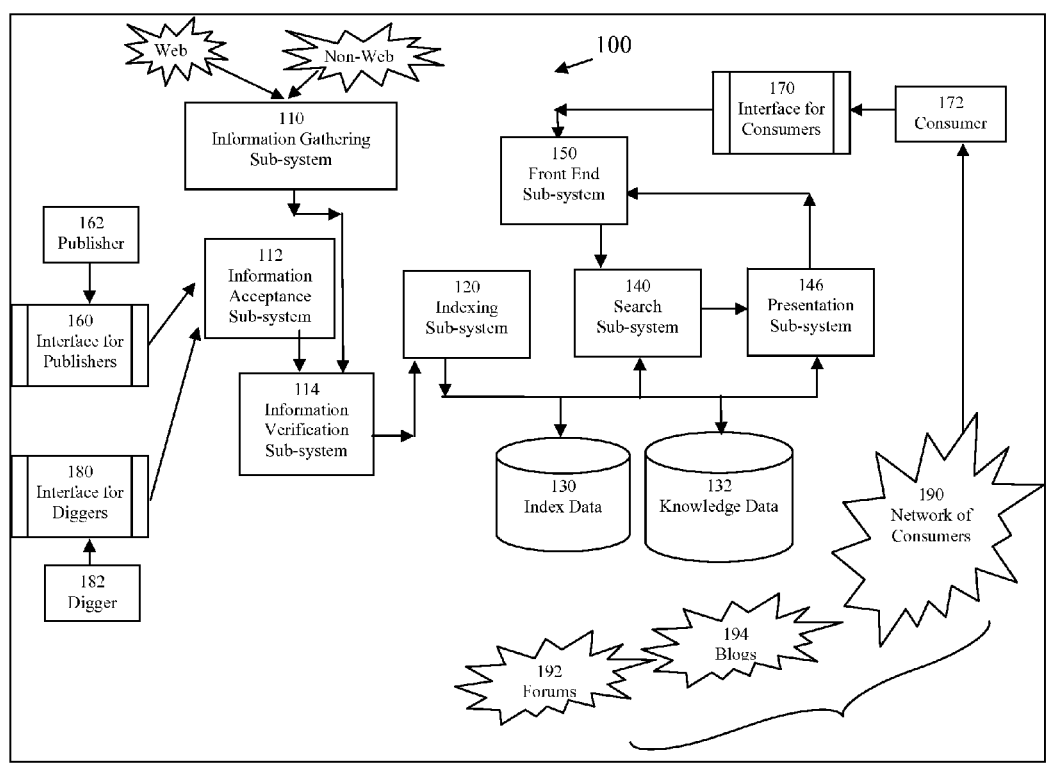
FIG. 2 depicts schematically "system 100", a preferred embodiment of a publishing site, showing interactions among publishers, diggers, consumers, an information gathering component, a searching component, and others.

Refer to FIG. 2, which shows components of system 100, an embodiment of the current invention.

Figure 3:
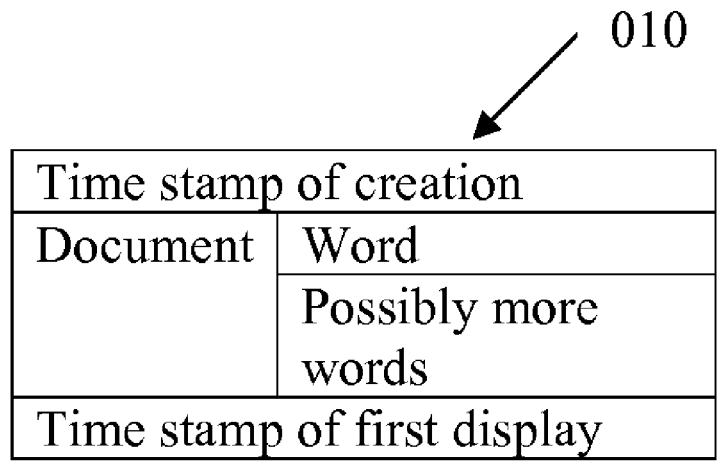
FIG. 3 depicts schematically a data structure of an Information-entity 010.
Figure 4:
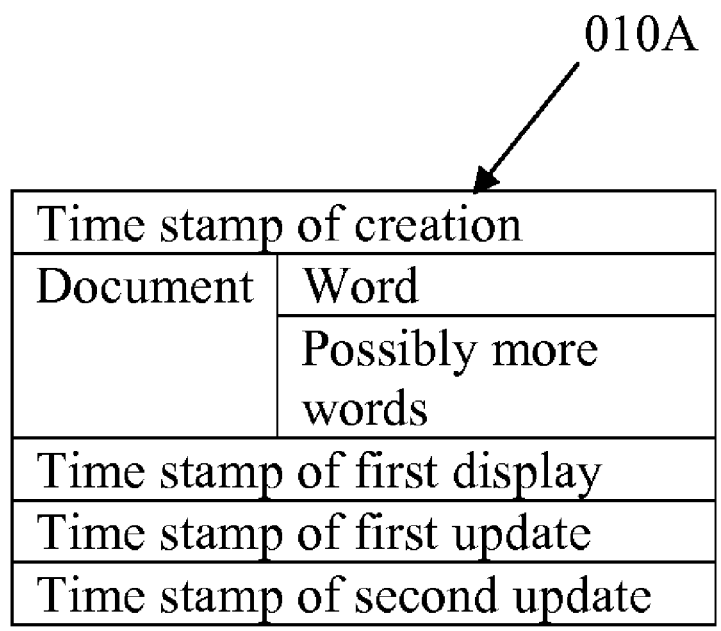
FIG. 4 depicts schematically the data structure for an Information-entity 010 after its being updated twice.

In system 100, the "unit information of focus" (e.g., such a unit in a search engine is a web page) is "information-entity" 010, and would typically be stored in Index Data 130. As depicted in FIG. 3, which consists of at least two parts, (1) a first time stamp indicating when the information-entity is created; and (2) a document. A document in its most general form is an ordered list of words. After an information-entity is processed by the system and for the first time ready to be displayed, the information-entity acquires a second time stamp. As shown in FIG. 4, an information-entity 010A can be updated, and for each update, a timestamp is added. The fresher a displayed information-entity is, the more useful it is to consumers of information, namely the closer the second time stamp is to the first, the fresher of the information-entity.

Figure 5:
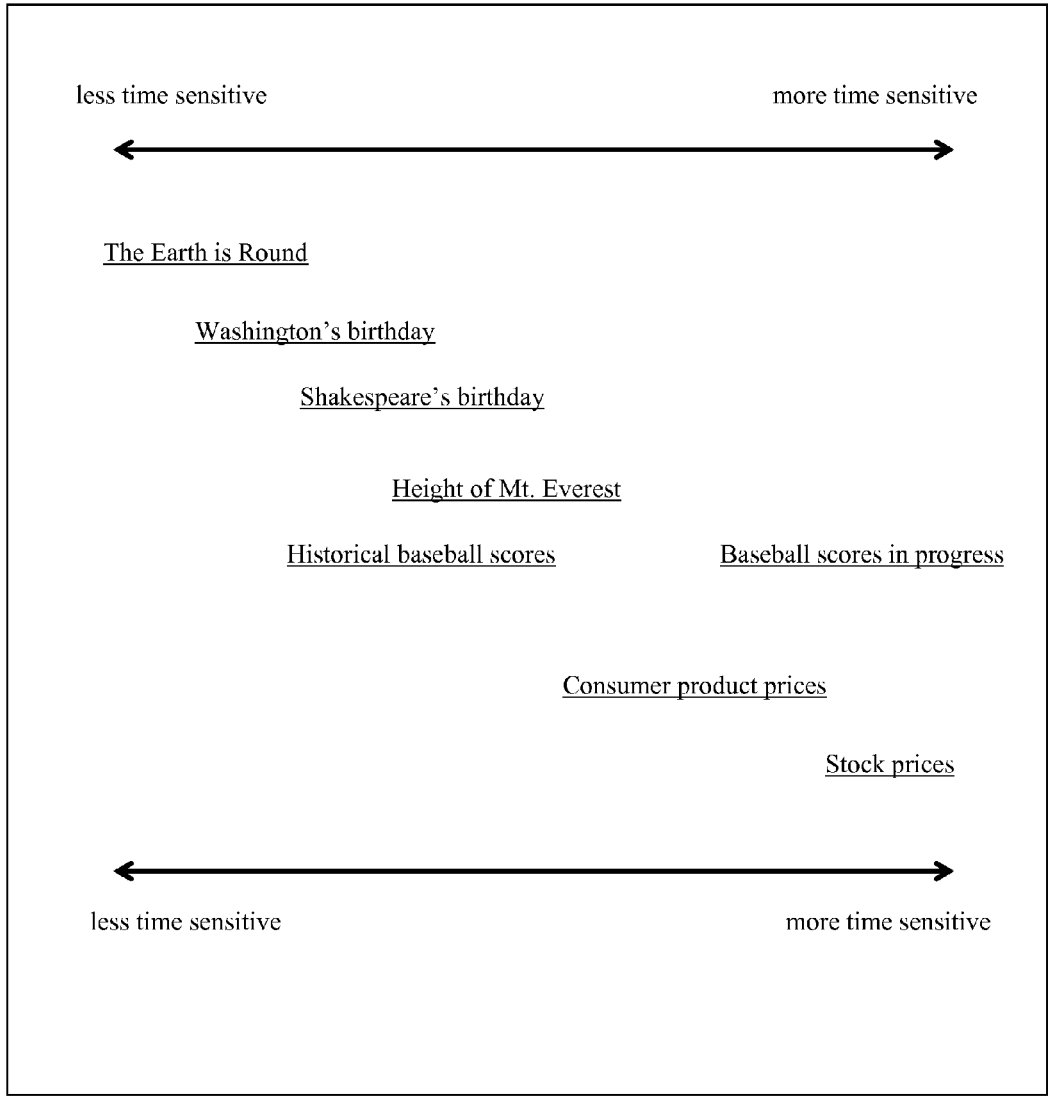
FIG. 5 depicts examples of data of varying time-sensitivity.

"Time-sensitive" data is what information-entity 010 models. Data exist with different levels of time-sensitivity. Some data does not change a lot over time, others changes rapidly. It is the latter that are most effectively dealt with by this invention. Refer to FIG. 5 for examples of data of varying time-sensitivity. The "fact" that "the Earth is round" is not very time sensitive, at least since Columbus's time, since it is unlikely that this will ever be updated again as a fact accepted by humans. "Washington's birthday" and "Shakespeare's birthday" are bit more time-sensitive, since there is always the likelihood that some day it is found out that Washington's birthday is not the current well-known Feb. 22, 1732; and Shakespeare's birthday is more time-sensitive because there has been debate on what exactly it is, thus the date would be updated from time to time with new discoveries. "The height of Mount Everest" has its own twist. The height has been increasing thus it is time-sensitive; however, few people (or, consumers of this information) care about its daily new height therefore in this sense this piece of data is not quite time-sensitive. There are hardly any reasons that "historical baseball scores" would change, which contracts with "baseball scores in progress", which could change within minutes, therefore the latter is much more time sensitive than that former. "Consumer product prices" are known to change over time, over years (e.g., price of rice), weeks (e.g., price of electronics), daily (e.g. gasoline price), and even hourly (prices of produces at a farmer's market). On the other hand, stock price is known to change within a second, making it much more time-sensitive than consumer product prices.

System 100 makes searchable all information-entities within the domain. The Information Gathering Sub-system 110 is responsible for proactively gathering information from various sources, including but not limited to the Web. The Information Acceptance Sub-system 112 accepts a piece of information in at least two ways: (1) the Publisher 162 inputs through the Interface for Publishers 160; and (2) the Digger 182 (or named "human digger" instead of "digger) inputs through the Interface for Diggers 180. A piece of information is then provided to the Information Verification Sub-system 113 so that the truthfulness is verified to the extent that's possible. After that, the Indexing Sub-system 120 identifies phrases, words, numbers, time and dates, and other contents within each piece of information, transform pieces of information into information-entities, indexes information-entities into a format that is convenient to search, and the result is Index Data 130. Knowledge Data 132 stores lists, look up tables, statistics about information-entities and others. The Front End Sub-system 150 receives queries from a Consumer 172 via Interface for Consumer 170, and provides them to the Search Sub-system 140. The Search Sub-system 140 is responsible for identifying phrases, words, numbers, time and others in the search query, matching the query with stored information-entities in Index Data 130, and then ranking the matched information-entities using factors including but not limited to the presence of phrases, words, numbers, times, as well as factors from Knowledge Data 132. The ranked information-entities (search results) are provided to the Presentation Sub-system 146. The Presentation Sub-system 146 makes cosmetic changes to the search results, formats the search results, and sends them to the Front End Sub-system 150, which displays the search results to Interface for Consumer 170.

Submitting new information or updating existing information is a type of "task" on the publishing site. The term "task" is used in a broad sense, indicating anything that can be executed. Several kinds of tasks are contemplated as below: (i) publishing; (ii) gathering; (iii) updating; and (iv) removing.

Tasks are executed in certain orders, which can be modeled as queues of items. The interval between receiving a request of inserting a task to a queue, to the execution of the task, could be within 30 seconds. Thus, a publisher could request the publishing of a new piece of data, or a modification to an existing piece of data, and see the data published within such an interval. The interval between the execution of two tasks could be set as an interval of choice. For example, if there are two publishers, each submitting a request within a same second; and the first publisher's data could be published within 5 minutes from the time of the request, and the second publisher's data could be published more than one hour from the time of the request.

Figure 6:
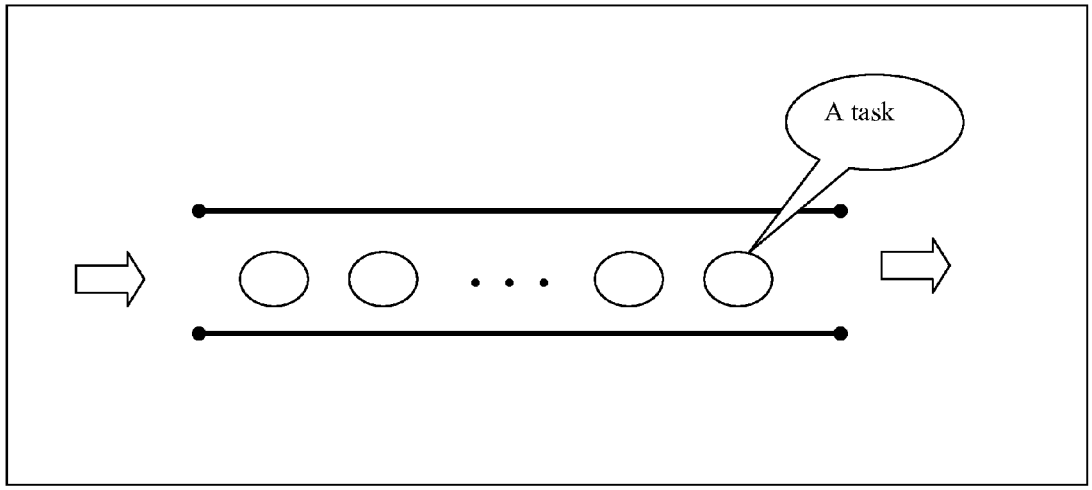
FIG. 6 depicts schematically a first-in-first-out queue of tasks.
Figure 7:
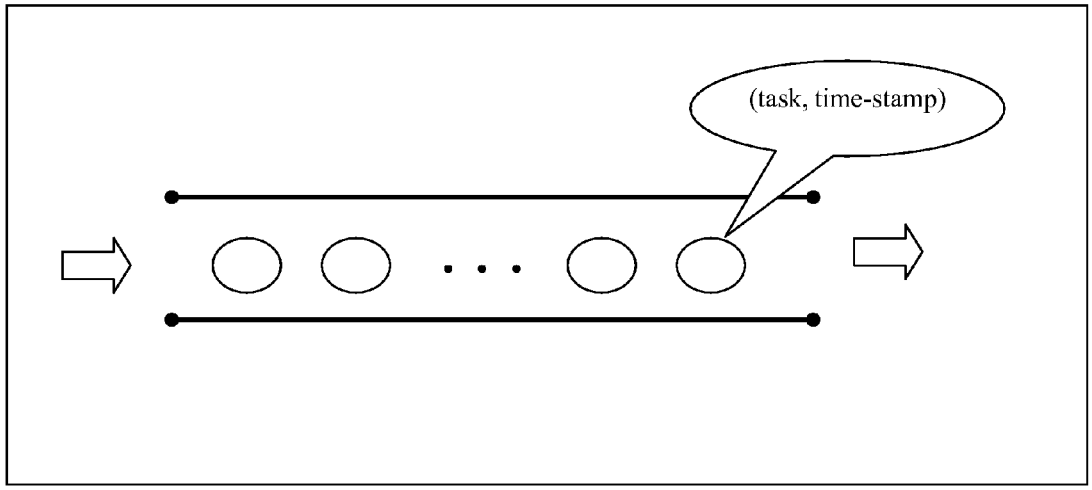
FIG. 7 depicts schematically a "task-timestamp" queue.
Figures 8, 9:
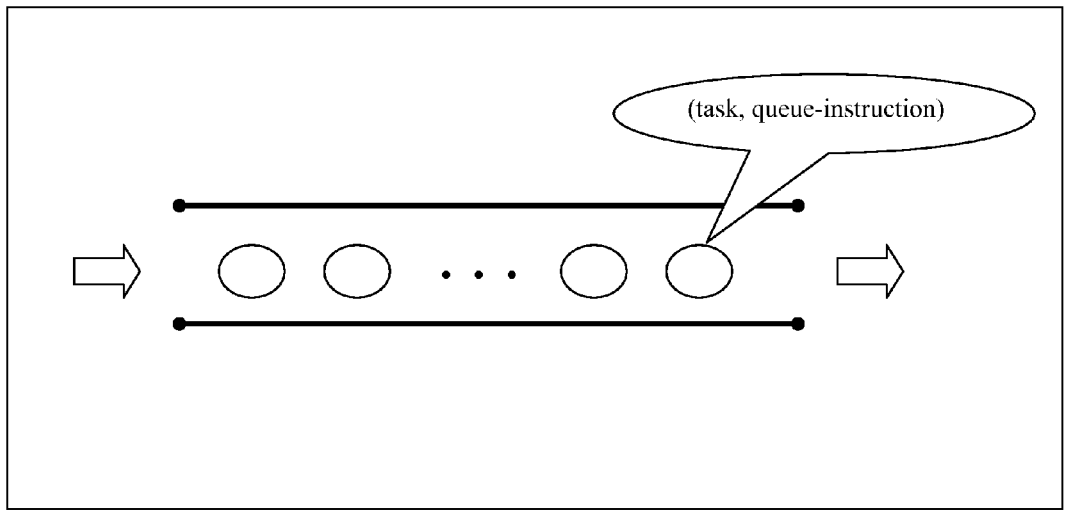
FIG. 8 depicts schematically a "task-instruction" queue.
FIG. 9 depicts schematically a fee schedule that associates delays with fees.

Some forms of such a queue are contemplated as follows: (i) a first-in-first-out queue, referring to FIG. 6, where each an item corresponds to a task, such as updating a portion of a publisher's information; and tasks are executed in the first-in-first-out order; (ii) a queue of items, referring to FIG. 7, where each item is a pair of (task, timestamp). A pair of (task, timestamp) expresses that the task is to be executed by the moment indicated by the timestamp; and (iii) a queue of items, referring to FIG. 8, where each item is a pair of (task, queue-instruction), where "queue-instruction" are actions to be performed on the queue, for example, moving an item to the head of the queue, moving an item three times forward toward the head of the queue, moving ahead of all items associated with a timestamp, moving behind an item that is associated with a publisher.

A queue could be altered. One contemplated such operation is "to position an item in a queue", which involves adding an item to the queue, or change an item's relative position to other items in the queue. Another contemplated operation is to change the content of a task.

A set of fee schedules exist in the system. A schedule impacts which pieces of data of which data provider gets published at what time. Several embodiments of such a fee schedule are contemplated: (i) a schedule that associates delay in publishing data (the unit of data could vary, for example, being 1 piece of information, or 100 pieces of information. This applies to all forms of fee schedules) from a data provider with paid fees, referring to FIG. 9, which depicts an excerpt of a possible fee schedule, with which a publisher's data gets updated within 24 hours without the publisher paying any money; a publisher's data gets updated within 4 hours if the publisher pays $1; and within 30 minutes if $10, and within 30 seconds if $100; (ii) a fee schedule that associates a paid fee paid by a data provider with the percentile of position of a publishing task from the data provider, referring to FIG. 10 for an excerpt of such a schedule. A position of a task is the task's position in a queue as described above. A top 5% position means the task is ahead of 95% of tasks in the queue, and with this particular schedule, the data provider pays $101. The rest of the schedule indicates a top 10% position for $51; a top 25% position for $21, and a top 75% position for $11; (iii) a fee schedule that associates a fee with a "jumping in a queue" operation, referred to FIG. 11 for an excerpt for such a schedule, where by paying $200, a data provider can move his/her task forward by 1000 positions; $50 for moving forward by 100 positions; $1 for moving backward by 10 positions; and $1000 for moving the data provider's task ahead of a named provider.

Figure 12:
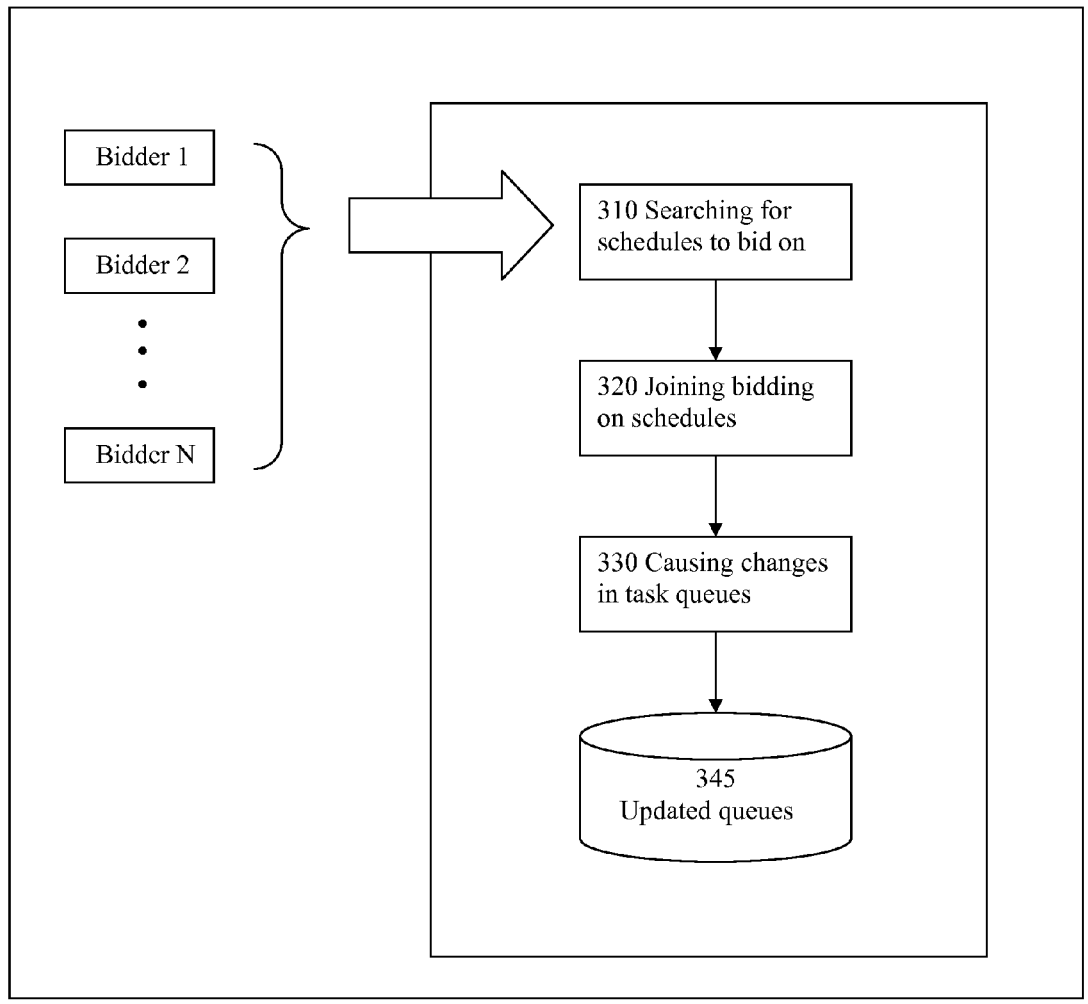
FIG. 12 depicts schematically a bidding process for schedules.

A set of fee schedules, one embodiment of which is depicted in FIG. 12 as schedule 165, are associated with the interface for publishers 160. The schedules largely decide how frequently, and when exactly, a publisher can input or update information with the site. A publisher could provide financial incentive to the system in order to position in a schedule. Further a publisher could participate in an auction in order to position in a schedule.

Another set of fee schedules, one embodiment of which is depicted in FIG. 1 as schedule 114, are associated with the "Information Gathering Sub-system" 110. These schedules largely decide how frequently, and perhaps exactly when, the site proactively gather (typically in the form of crawling) information from a portion of a source. A source, typically a publisher, could provide a financial incentive to the system in order to achieve a given or relative position in a schedule. Further such a source could participate in an auction in order to achieve a given or relative position in a schedule.

Refer to FIG. 12, which depicts schematically a bidding process for schedules. A number of bidders, typically publishers, participate in such an auction. At step 310, a bidder searches for schedules of interest, by submitting tasks of interest. Some of tasks of interest are contemplated below: publishing of the price information of a product; updating information; advertising a sale in future. Once a bidder chooses a returned task, she enters into step 320 bidding on a queue associated with the task. Typically she needs to pay to the site in order to enter an auction. Sometimes there are more then one bidder interested in a task (e.g., publishing price information of a particular product), then the bidders bids for a favorable treatment, in terms of rapidity of executing a task, or in terms of relative positioning in a schedule, among other possibilities. Thus, it is expressly contemplated that a publication site could differentially update first and second data as a function of a result of an auction; and that the auction could involve associating first and second data with first and second: (i) update delays; or (ii) crawling delays of related websites related to the first and second data, respectively. All forms of auctions are contemplated, including standard auction, reverse auction, multiple item auction, fixed piece auction, blind auction, and half blind auction. Once an auction concludes, in step 330, schedules are updated accordingly, when tasks, timestamps, order of tasks, and other aspects of a queue might be changed. The result is updated queues 345.

Referring again to FIG. 2, the Network for Consumers 190 allows consumers such as the Consumer 172 to communicate with each other. Within such a network, each consumer has an address where information can be sent. Further, the system operates Forums 192 and Blogs 194, where people (consumers and publishers alike, as well as people working for the system) can post. A forum belongs to one or several topics. Some or all forums are moderated by people working for the system. Blogs can be owned by consumers, publishers as well as people working for the system. The system reserves the right to take down any blogs.

Figure 13:
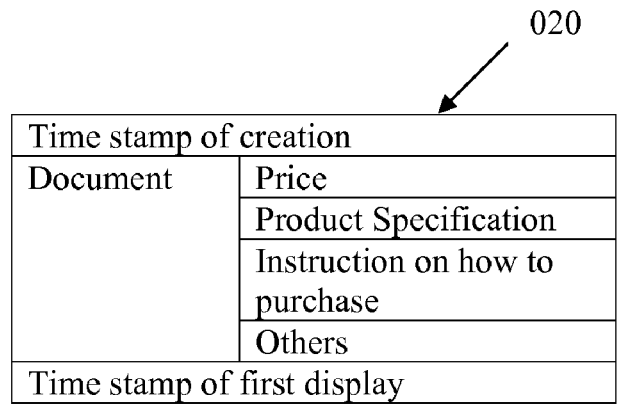
FIG. 13 depicts schematically a data structure for an Information-entity 020.

One embodiment of the system 100, dubbed "system 200" (not separately shown), performs the following search task: in the "domain" of shopping, make searchable all information-entities within the domain. FIG. 13 is an embodiment of an information-entity 020 useful in that regard. An information-entity 020 preferably has a document that contains at least the following: a product specification, a price, and an instruction on how to purchase.

Figure 14:
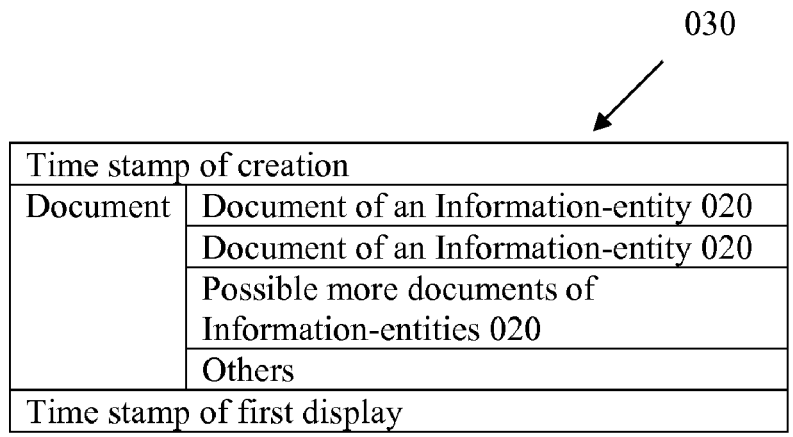
FIG. 14 depicts schematically a data structure for an Information-entity 030.

Another embodiment of the system 100, dubbed "system 300" (not separately shown), performs the following search task: in the domain of shopping for "bundled products", make searchable all information-entities within the domain. FIG. 14 is an embodiment of an information-entity 030 useful in that regard. An information-entity 030 has a document that is the result of merging two or more information-entities 020, so that with one embodiment, an information-entity 030 contains information of at least two products, or at least two services, or at least one product plus one service.

Figure 15:
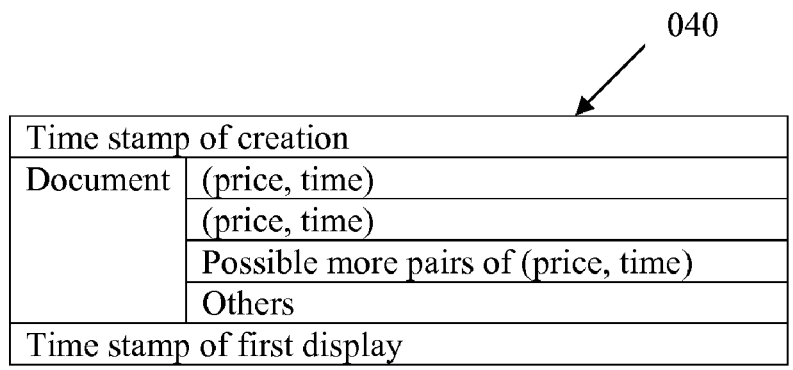
FIG. 15 depicts schematically a data structure for an Information-entity 04.

Still another embodiment of the system 100, dubbed "system 400" (not separately shown), performs the following search task: in the domain of incentives such as coupons and discounts, make searchable all information-entities within the domain. FIG. 15 is an embodiment of an information-entity 040 useful in that regard. An information-entity 040 has a document that consists of at least pairs of (time, price).

With a preferred embodiment a system includes all of the above systems. Additional information on applying system 200, system 300 and system 400 to online shopping is detailed below.

Consumers have accounts with the system. They can forward information to each other or to any other parties, in this sense, they are "networked". A consumer can forward information-entities to other consumers, and such information-entities might be of value, monetary or otherwise. For example, what is forwarded could be a coupon; for another example, what's forwarded could be information on a hot product at a very low price. Consumers are incentivized by the system to do such forwarding. Values are allocated and accumulated in consumers' own accounts. Payouts to top earners, named or unnamed, are published on the system for all to see.

With one embodiment, an allocation is performed as follows:

(1) Suppose the value of a click on a deal is 1.00;

(2) Consumer A has forwarded the deal to Consumer B;

(3) If B clicks on the deal, then A gets a value of 0.10;

(4) If B forwards the deal to Consumer C, and C clicks on it (4.1) then Consumer B gets a value of 0.05, and (4.2) consumer A gets a value of 0.12.

The system also runs a contest system. A contest among consumers could be on getting new product ideas and product designs. With one embodiment, a contest is divided into two periods. During the first period of time, consumers vote with their play money, but the tally is not visible to them. At the end of the first period, voting is closed. During the second period of time, activities associated with the item being voted plays out. At the end of the second period of time, winners are announced, based on votes from the first period, as well as activities from the second period of time. Winners are rewarded with values, monetary or otherwise.

With such contests, it is possible for consumers to affect the outcome. Thus with this collective design with "swarm intelligence", consumers get a chance shaping the next hot items. Ranking of the new designs as well as ranking of the consumers involves a method of assigning scores to both voters and items being voted.

3. Comparison Shopping

Application of system 200 to online shopping, with a focus on comparison shopping, is described below. With a preferred embodiment, the central "unit" on the system is a "deal" (analogous to a "listing" on eBay). Parties involved are sellers, consumers, and the system.

In the "domain" of shopping, a key focus is the combined information on a product and its price. There is the need of giving shoppers "instructions" on how to make a purchase: which (online or offline) store to "go to"; what kind of in-store coupons to apply; what kind of mail-in rebate to use, and do the purchase by what date, etc.

A deal is defined as a combination of product(s), price, instructions on where and how to buy. A deal might be described as "Canon Powershot A540, $200, Buy.com". There could be a number of qualifications of a deal, for example, "available today", "two rebates". In the system, a deal typically is stored as an embodiment of an information-entity 020, as depicted in FIG. 13.

With one embodiment, the system comes "alive" by going though the following steps:

(a) It culls information from all available sources, therefore, it is not necessary for the store to proactively push out information (although the store is allowed to do so);

(b) The system thus knows a lot of "deals" for many products from many stores;

(c) One (a shopper, a store, a "generator", a "pricer") can search for a product, and deals from various stores are displayed;

(d) A pricer finds a deal on the system, and finds a better deal outside the system, that's the reason she's called a "pricer" of the deal;

(e) A generator searches for a product or products, cannot find it on the system; and he finds a deal for the products in question outside of the system, and posts the deal on the system. Thus he's called a "generator" of the deal;

(f) A shopper can do the following:

(f.a) look at a deal, and decide to buy (f.b) look at a deal, and let the system know she will buy it later (f.c) search for one product or a number of products, cannot find them, and let the system know that she's interested in getting it at a price range. This is called registering "intentions to purchase"

(g) A store can create and update deals;

With steps (e), (f), (h), various parties involved help to push down the price of a deal, thus achieving a high transparency in terms of prices.

Figure 16:
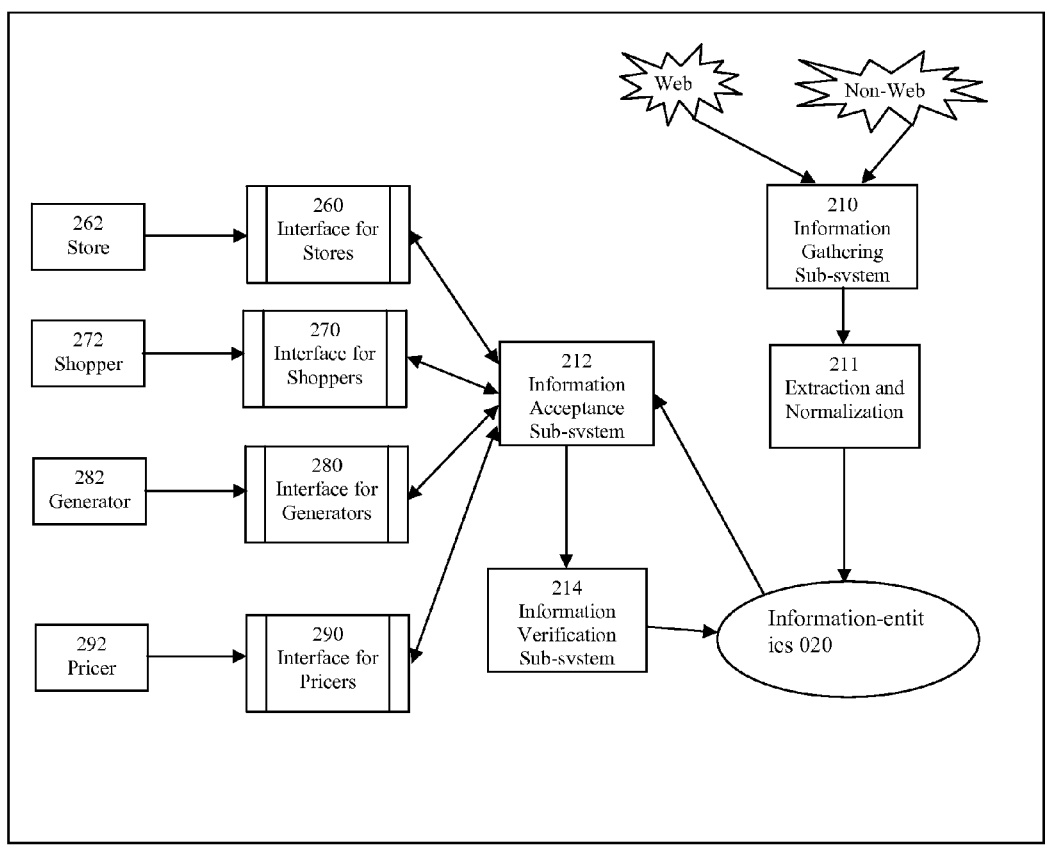
FIG. 16 depicts schematically how information-entities 020 are created in system 200.

Referring to FIG. 16, in one embodiment, information-entities are created or modified by sub-systems 210, 211, 212 and 214. Information-entities are created either by the system via 210 and 211, or by other parties through interactions among 260, 280, 290, 212 and 214. Information-entities can be modified through interactions among 260, 280, 290, 212 and 214. Those of skill in the art will appreciate that this part of the system will perform other functions and these other operations are not further described.

A deal could be "generated on the system" in ways including but not limited to the following: (i) A store, which proactively makes the deal visible on the system; (ii) The system, which synthesizes information available to it and makes a deal visible on the system; and (iii) A "generator", who finds a deal on her own power, and makes it visible on the system.

A form of an incomplete deal is an "intention to purchase", which comprises of only an item or items to purchase. For example, "Canon Powershot A540". Once a deal is created, it is visible on the system, and someone (a pricer, the system, or a store) can try to beat the deal by showing a better price that can be obtained, or better in other senses.

The system creates information-entities in the following way: Information from a "domain" such as shopping, is proactively gathered by the system by the Information Gathering Sub-system 210. Sources of information could be Web or non-Web. Information from the Web includes but not limited to web site's information in HTML or XML or RSS or other formats. Information from non-Web sources include but not limited to product catalogues and print advertisement. Once information in various forms is gathered, it needs to be understood and transformed into Information-entities 020. The task is performed by the "Extraction and Normalization" step 211 which has at least the following functional stages with one embodiment: (i) extracting numbers, currency signs, and others that are indicative of prices. Normalize into an internal form; (ii) extracting proper names of at least the following: stores (e.g. NewEgg.com), manufacturers (e.g, SONY), product names (e.g. Cyber-Shot), product models (e.g., DSC-T50). Normalize into an internal format; and (ii) extracting instructions on purchases, including but not limited to coupon offers, manufacturers' mail-in rebate information. Normalize into an internal format.

A Shopper or other consumer 272 creates an information-entity in the following way, through the Interface for Shoppers 270. The information-entity created by the shopper is an "intention to purchase" of a product. With one embodiment, following steps are included:

(1) Optionally identify itself with the system;
(2) Input information for some or all of the necessary fields for an information-entity 020;
(3) Wait for the Information Acceptance Sub-system 212 to process, and prompt for possible further input in order to complete an information-entity 020. For example, the shopper might have input a product name (e.g., Cyber-Shot) but not a model (e.g. DSC-T50), and the Information Acceptance Sub-system would prompt to input the model.
(4) Optionally input a desired price or a desired range of prices, e.g., "under $500", "between $300 to $500";
(5) Optionally input a desired time period for purchase, e.g., "by December", "in 3 weeks";
(6) Optionally input other information;
(7) Finish inputting.

A Store 262 creates an information entity in the following way, through the Interface for Stores 260. A store has a prior authentication with the system, which recognizes that the store is the one selling a product associated with the information-entity being created. With one embodiment, following steps are included:

(1) Identify itself with the system;
(2) Input information for some or all of the necessary fields for an information-entity 020;
(3) Wait for the Information Acceptance Sub-system 212 to process, and prompt for possible further input in order to complete an information-entity 020. For example, the shopper might have input a product name (e.g., Cyber-Shot) but not a model (e.g. DSC-T50), and the Information Acceptance Sub-system would prompt to input the model.

A Generator (a type of "human digger") 282 creates an information entity in the following way, through the Interface for Generators 280. A generator has a prior authentication with the system, which recognizes that the generator is not selling a product associated with the information-entity being created, but is creating an information-entity about a deal that's not known to the system. Otherwise the steps are similar to those for a store as described above.

Once an information-entity has been created, the Information Acceptance Sub-system 212 sends it to the Information Verification Sub-system 214 for correctness checks, which does at least the following with one embodiment: as far as it is possible, proactively go to a store's web site (or other available sources) to find information that is contained in the created information-entity 020, and see whether the two agree.

A Shopper 272 modifies an information-entity in the following way, through the Interface for Shoppers 270. The information-entity modified by the shopper is an "intention to purchase" for a product. A shopper can modify only an information-entity that has been created by himself. With one embodiment, the steps include but not limited to:

(1) Identify itself with the system;
(2) Retrieving an information-entity by browsing or searching;
(3) Interactively change one or more fields of the information-entity.

A Store 262 modifies an information entity in the following way, through the Interface for Stores 260. A store has a prior authentication with the system, which recognizes that the store is the one selling a product associated with the information-entity being modified. Otherwise the steps are similar to those by a shopper 272 as described above.

A Pricer (a type of "human digger") 292 modifies an information entity in the following way, through the Interface for Pricers 290. A pricer has a prior authentication with the system, which recognizes that the pricer is not selling a product associated with the information-entity being modified, but is modifying an information-entity about a deal that is already known to the system. Otherwise the steps are similar to those for a store as described above.

Figure 17:
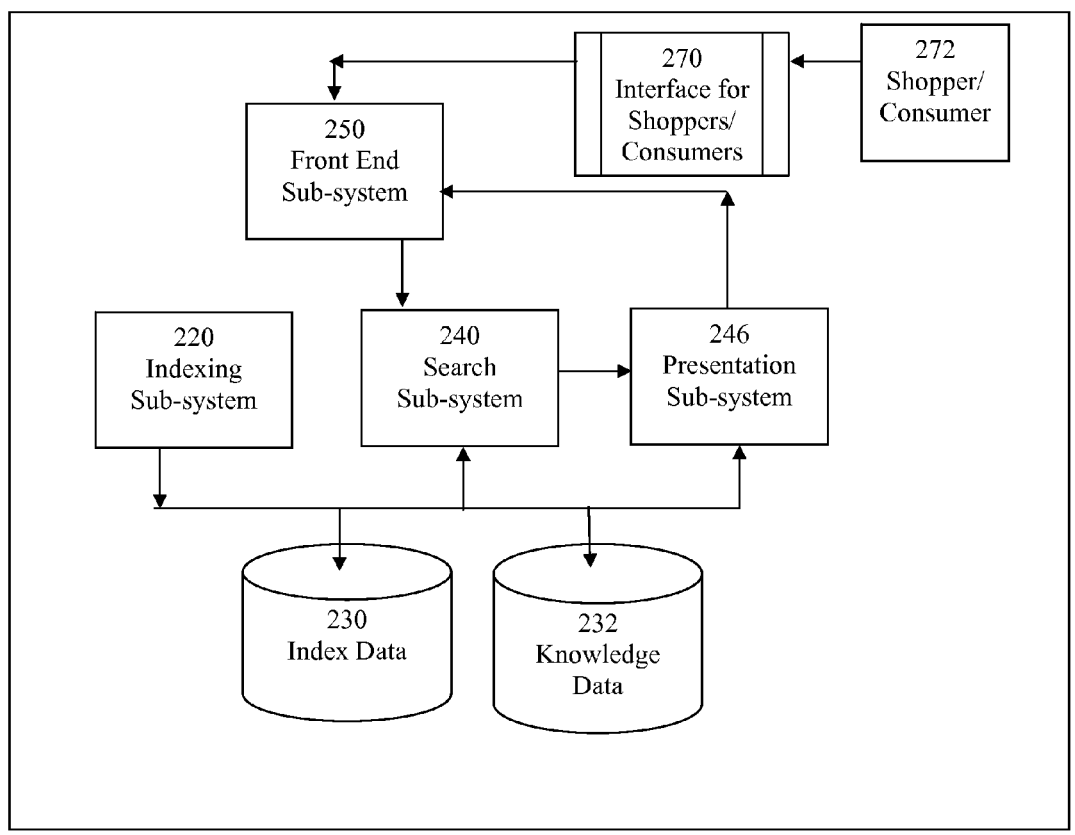
FIG. 17 depicts schematically searching with "system 200", another embodiment of this invention.

Once the system is filled with information-entities, they are searchable by various parties. Referring to FIG. 17, the Front End Sub-system 250 receives queries from a shopper 272 via Interface for Shoppers 270, and provides them to the Search Sub-system 240. The Search Sub-system 240 is responsible for identifying phrases, words, numbers, time and others in the search query, matching the query with stored information-entities in Index Data 230, and then ranking the matched information-entities using factors including but not limited to the presence of product names, models, specifications, store names, prices, and in general phrases, words, numbers, times, as well as factors from Knowledge Data 232. The ranked information-entities (search results) are provided to the Presentation Sub-system 246. The Presentation Sub-system 246 makes cosmetic changes to the search results, formats the search results, and sends them to the Front End Sub-system 250, which displays the search results to Interface for Shoppers 270.

A search query is first compared against knowledge contained in Knowledge Data 232, for proper names such as product names, product models, manufacturers, specifications, store names, prices, dates, among others. The query is segmented into recognized proper names and unrecognized text. The recognized proper names are compared against information-entities stored in Index Data 230. Typically the more proper names are matched, the better a matching.

Those information-entities that match at least one proper name are considered as matched deals, and are to be ranked.

For the system to compare two deals, the two prices are the primary factor. However, a secondary or a ternary factor could also be introduced. For example, with current search engines, exact matching can be seen as the primary factor, and Page Rank a secondary factor. For another example, current comparison shopping sites use "store reputation", "our best choice" as non-primary factors.

With the system, a secondary factor could be "the number of clicks", and a ternary factor "the number of purchases". The idea is that clicks and (especially) purchases are "votes" by consumers.

Another secondary factor depends on one statistic that only the system has: the number of times a deal being forwarded by a consumer. If such a forwarded deal results in a purchase, its "vote" is weighted higher than otherwise. With this recipe, other sites cannot replicate the ranking, and it is difficult to spam (as in what Search Engine Optimizers do to organic search results). With one embodiment, the static, along with other information of consumers can be used in ranking. Consider a list of deals and another list of consumers. A shopper is "important" if she votes for "good" deals, and a deal is "good" if it is voted by many "important" shoppers. The "goodness" is expressed by a non-negative real number. The above is a special case of a general way of assigning scores to bother votes and items being votes. Given a number of votes and a set of items to be voted, votes are first collected. Each voter is assigned a score, partially based on what items the voter has voted on and by how many votes. Each item is assigned a score, partially based on which voters have voted on the item and by how many votes. The assignment could be done in a iterative manner. The assignment can be based on the singular vectors of a matrix that represents the voting.

Another contemplated secondary factor is a "Savings Measure", which focuses on the savings that a deal generates. One formula is to calculate the difference between a deal's price and an "average" deal's price. Such a result can be further weighted by the number of clicks, the number of purchase, the number of "successful" forwardings, etc.

Among search results, there are at least three types of deals: current deals (those that are available immediately), past deals, and future deals (future deals exit, for one reason that some sellers give out coupons that are effective in future.) Typically when search results are displayed, a different area is provided for a type of results. Returned results can be optionally ranked according to the searcher's requests, such as by low to high prices, by store names, by last updated time, by "shoppers' reactions".

A deal is presented to a searcher with the following fields among others with one embodiment:
(1) Name of store;
(2) Information on the product, including product name, model among others;
(3) Final price to a shopper, after considerations on shipping, taxes, rebates, coupons and others;
(4) Information on "shoppers' reactions to the deal", including but not limited to the number of clicks, information on purchases, information on the deal being forwarded by shoppers to other shoppers.
(5) Optionally, information on how long ago the deal was last updated, e.g., "Last updated 3 minutes ago".
(6) Optionally other information.

Once a deal is clicked by the shopper, a "jump page", as is dubbed, is displayed, which contains additional information about the deal, including but not limited to the following, with one embodiment:
(1) Taking a 'one step look-ahead" for the buyer, and presenting information from the selling store in a synthesized form. Such information could be the kind of similar products are selling at the store, the kind of bundles that are being offered by the store;
(2) Displaying everything the system knows about the product, the deal, related rebates, related coupons, price history, among others;
(3) Displaying information on other shoppers' actions on this deal, including but not limited to the history of daily clicks, of daily purchases, of daily forwardings.

Further, contents on a jump page are partially dependent on the searcher, if something about the searcher is known to the system. For example, if the searcher has an account with the system, then all information contained in the account, history of the searcher's activities, could be used. For another example, if the searcher does not have an account, but is a repeat searcher, then whatever information that can be gleaned from cookies could be used.

The "generator" and "pricer" of a deal (or its incomplete form, an intention to purchase) have various degrees of ownership over the deal. The ownership is time-limited. Further, an ownership entitles benefits from actions associated with the deal. Such actions could be clicks on the deal, completion of purchase according to the deal, forwardings by other shoppers, etc. Typically such benefits decline in value over the time.

To encourage action, payouts to generators and pricers are displayed in various forms by the system, which posts the aggregated amounts generators and pricers have been paid to date, and today, and amounts paid to named or unnamed top earners, etc.

Through the Interface to Generators 280, the Generator 282 takes the following actions, among others, with one embodiment:
(1) log in to own account;
(2) create a deal by doing either of the following:
    (2.a) create a deal that has not been known to the system;
    (2.b) create a deal by first searching through "purchase intentions" made visible by the system;
(3) submit the deal to the system for deliver. The delivery can be performed in different delivery modes.

Through the Interface to Pricers 290, the Pricer 292 takes the following actions, among others, with one embodiment:
(1) log in to own account;
(2) find a deal by searching or browsing;
(3) submit a new deal thought to be better to the system;
(4) The system decides whether the two deals are the "same" or "similar enough" in terms of the product involved;
    (4.a) if yes, then the pricer has beaten the original deal;
    (4.b) otherwise, it is considered that the pricer has in fact generated a deal.

Upon a shopper's submission of an intention to purchase (e.g., "Cannon Power-shot A540, $300"), the system returns ranked deals. The shopper can choose to take a deal. Alternatively the shopper can choose to let stores offer a better deal in a short period of time (hours, minutes or even seconds), or choose to leave the system for the moment and be alerted later by a better deal.

With one embodiment, the following steps describe this "reverse auction" of a shopper's intention to purchase, through the Interface for Shoppers 270. Note the term "reverse auction" is used as a convenience. The process, as described below, does not ask any participant to commit to a deal until a participant explicitly takes a deal:

(1) A shopper submits an intention to purchase;
(2) Ranked deals are displayed;
(3) The shopper indicates that she wants the stores to offer a better deal;
(4) On the list of ranked deals, there are three types of stores:
   (4.a) Stores not participating in such a reverse auction (either not in any reverse auctions, or not in reverse auctions for relevant products). The price information of deals from such stores would not change;
   (4.b) Participating stores which have specified a set of rules with the system a priori. Such a rule could be "give a $1 discount", or "change the price so that my deal is No. 2". The system applies the rules, and prices of deals from such stores might change accordingly;
   (4.c) Participating stores which choose to change in real-time the price of its deal;
(5) The displayed deals change according to changes made to the deals by stores;
(6) The shopper can choose to do any of the following
   (6.a) take a deal; or,
   (6.b) submit a modified intention to purchase, thus looping back to step 1 above. Typically the modification is on prices, namely the shopper asks for a lower price; or,
   (6.c) request the system alert her a better deal at another time through email or other means, and leave the system; or
   (6.d) leave the system.

Through the Interface to Shoppers 270, the shopper 272 can take a number of actions, including but not limited to the following, with one embodiment:

(1) Without logging in;
   (1.a) submit a query;
   (1.b) look through ranked deals returned by the system;
   (1.c) optionally re-rank the deals according to criteria such as prices, timestamp of the last update, etc.;
   (1.d) the system optionally prompt best matching bundling products (e.g., when the shopper is searching for a digital camera, the system might prompt memory cards or batteries);
   (1.e) optionally click on a deal, and see the jump page. (Not necessarily known to the shopper, the system gets paid by the store for delivering this deal to the shopper. Also, "owners" of the deal get value, too, as described above);
   (1.f) complete a purchase online. (Not necessarily known to the shopper, the system might get paid by the store. Also, "owners" of the deal get value, too.);
(2) Logging in and do all of the above;
(3) Logging in;
   (3.a) register a "purchase intention";
   (3.b) choose one of the following actions;
     (3.b.1) let stores offer a better deal instantaneously;
     (3.b.2) let the system alert for a better deal at another time;
(4) Logging in;
   (4.a) Search for a deal;
   (4.b) Click on a deal and forward it to other shoppers;
     (4.b.1) the shopper becomes a "partial owner" of the deal;
     (4.b.2) forwarding has a TTL (time to live);
        (4.b.2.i) TTL is initially set at 2 with one embodiment;
        (4.b.2.ii) TTL decreases by 1 each time the deal is forwarded;
        (4.b.2.iii) when TTL is 0, the deal cannot be forwarded;
(5) The shopper can optionally ask the system to send deals to a cell phone through text messaging or other means.

Through the Interface to Stores 260, the store 262 can take a number of actions, including but not limited to the following, with one embodiment:

(1) log in to account;
(2) create or modify a deal by doing any of the following:
   (2.a) create a deal that's unknown to the system;
   (2.b) create a deal by first searching through "purchase intentions" made visible by the system;
   (2.c) modify a deal that has been created by the store itself previously;
(3) ask the system to deliver a deal through one of the delivery modes;
(4) engage in reverse auction;
   (4.a) in real time; or
   (4.b) submit own bidding rules to the system, or modify such rules that the store have submitted previously.

The system while maintaining search quality to shoppers, has a number of ways of encouraging stores to pay for audience, pay for access, pay for freshness.

(1) "Pay-for-freshness": Sellers agree to pay get a chance to update its deals continually. Those non-paying stores must rely on the system to do the updates, which by nature could be slower.
(2) "Pay-for-audience": Stores who do not agree to pay will be exposed to a smaller audience;
(3) "Pay-for-access": In the case of reverse auction, those non-paying stores do not get to bid.
(4) "Pay-for-fullness in information": The system can optionally withhold certain information (e.g., number of clicks on a store's deal) for those non-paying stores.
(5) "Termed invoices": the system monitors purchases and bills a store. The store is treated as a non-paying store until it agrees to pay.

Further features offered by the system are contemplated. Given a deal, the system returns other deals that are "similar in essence". For example, in the case of buying a memory stick for a digital camera, the "essence" is a memory stick. The essence might also include the capacity, namely 2G or 4G. In the context of shopping, comparing the prices of two deals might include factors additional to prices. For example, when buying a memory stick, with deal 1 from store A, a consumer pays $2, gets some software, and fills out two rebate forms, in order to get a 2G memory card. With deal 2, a consumer would pay $9 more, fills out one rebate form, and gets a 4G card.

Consider another example. Given deal, "Pavilion DV9205US laptop at $999.99 after store savings and a mail-in rebate, buy at Fry's Electronics today". If a consumer checks around wanting to know: with $1000, what are the "similar" laptops I can get? The consumer certainly could go to Fry's and ask a clerk there. Alternatively, the consumer can be helped by a search tool that returns "products similar in essence".

Figure 18:
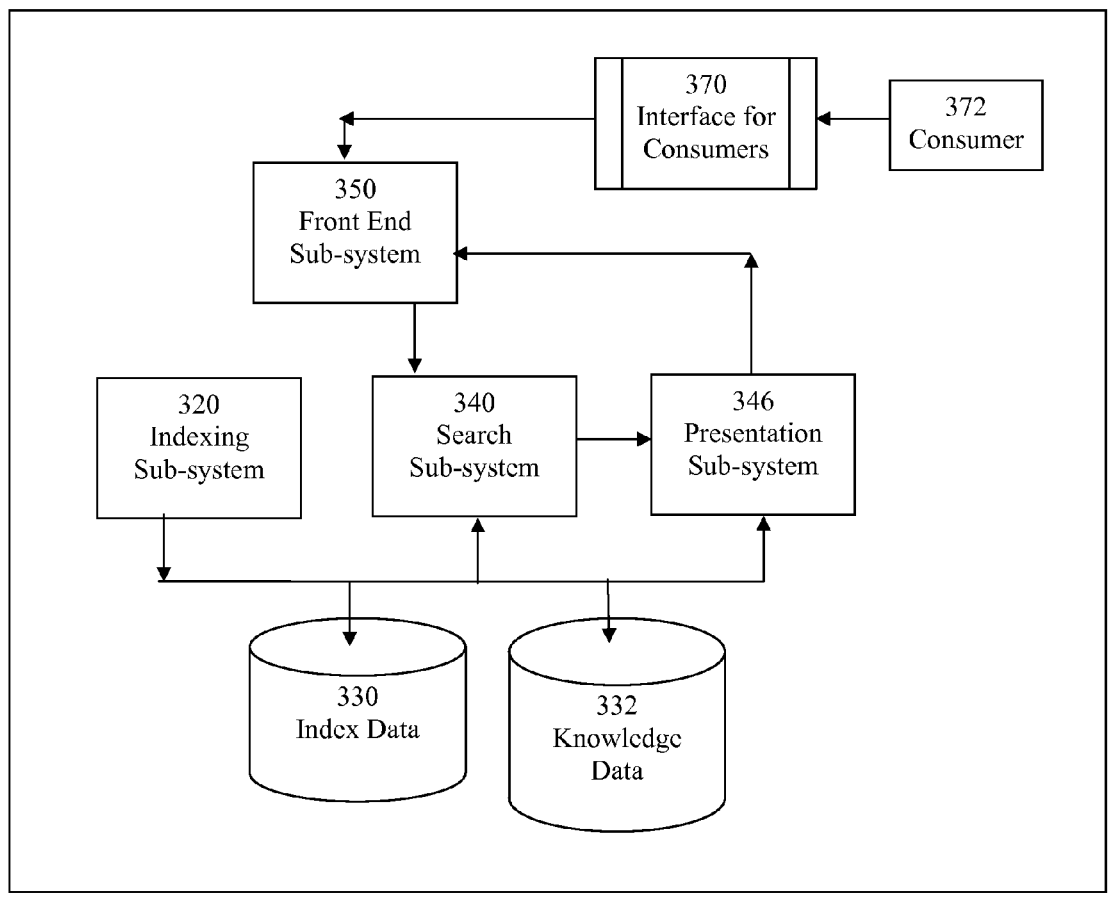
FIG. 18 depicts schematically searching for deals of bundles with "system 300", still another embodiment of this invention.

Referring to FIG. 18, a schematic for shopping for bundled products. The Front End Sub-system 350 receives queries from a Shopper 372 via Interface for Shoppers 370, and provides them to the Search Sub-system 340. The Search Sub-system 340 is able to identify proper names and decide whether in the query there is more than one product. If so, the query is for a bundle. The query is first matched against Index Data 330 for bundles of same products. Then the query is matched against Index Data 330 for one or more, but not all products in the bundle.

In the "domain" of shopping, a common need of shoppers is buying a number of products together, for example, "Canon Powershot A540 and an ULTRA 2G high speed memory card", or simply, "a digital camera with a memory card".

With one embodiment of system 100, dubbed system 300 by us, the central unit of information is that of deals for bundles. In the system, information on a deal for a bundle is represented as information-entity 030 referring to FIG. 14. System 300 is similar to system 100, except a number of differences outlined in the following sections, among other possible differences.

Given a search query for deals on a bundle of two or more products, the system finds two kinds of deals: (1) a deal might be from a single store, namely the store sells all the products in the bundle; (2) a deal where some of the products are to be purchased from one store, and others from another, and possibly still others from yet another store.

With one embodiment, the following steps describe the "reverse auction" of a shopper's intention to purchase of a bundle, through the Interface for Shoppers 370. Note the term "reverse auction" is used as a convenience. The process, as described below, does not ask any participant to commit to a deal until a participant explicitly takes a deal. Without the loss of generality, the bundle in the following has two products.

(1) The shopper submits an intention to purchase of a bundle;
(2) Ranked deals are displayed;
(3) The shopper indicates that she wants the stores to offer a better deal;
(4) A reverse auction starts, treating the bundle just like a single product, as discussed above.
(5) Meanwhile, a reverse auction starts, treating the bundle as two separate products, each to be sold by a store.
  (5.a) A store can choose to offer a better deal on one of products;
  (5.b) Store A willing to offer a deal on product X can choose to "invite" Store B to offer a deal on product Y;
    (5.b.i) Such an invitation could have been set a priori between the two stores;
    (5.b.ii) Such an invitation could also be delivered and acted upon in real time;
(6) The display of deals change according to changes made to the deals by a store or stores;
(7) The shopper can choose to do any of the following
  (7.a) take a deal on the bundle; or,
  (7.b) submit a modified intention to purchase of bundles, thus looping back to step a) above. Typically the modification is on prices, namely the shopper asks for a lower price; or,
  (7.c) request the system alert her a better deal at another time through email or other means, and leave the system; or
  (7.d) leave the system, or
  (7.e) submit a modified intention to purchase one or more items in the bundles, thus looping back to step a) above.

A special case of a "bundle" is "multiple copies of a same product", for example, "500 SONY Cyber-shot DCS-T50".

Further features of the system are contemplated below. Consider a bundle that was for sale at a store circa February 2007: a Presario SR2170NX desktop bundled with an HP VS15E 15" LCD monitor at a $549.98 final price. This poses difficult questions. First, there is no online tool for checking out bundled items. Second, the consumer could say, "my budget is $500, but I am OK to go over to $550, give me all 'bundles similar in essence' to this Fry's bundle". Given a bundled deal, the system returns "bundles similar in essence", which helps that consumer who makes bundled purchases.

A shopper might not want an item in a bundle, and can optionally exchange money with the system for the unwanted item.

Still another embodiment of system 100, dubbed "system 400", which focuses on incentives such as coupons and discounts, such as "$20 off $50 purchase if done on our web site".

Incentives are internally modeled by the system as information-entities 040, which contains at least pairs of (time, price), as depicted in FIG. 15.

Figure 19:
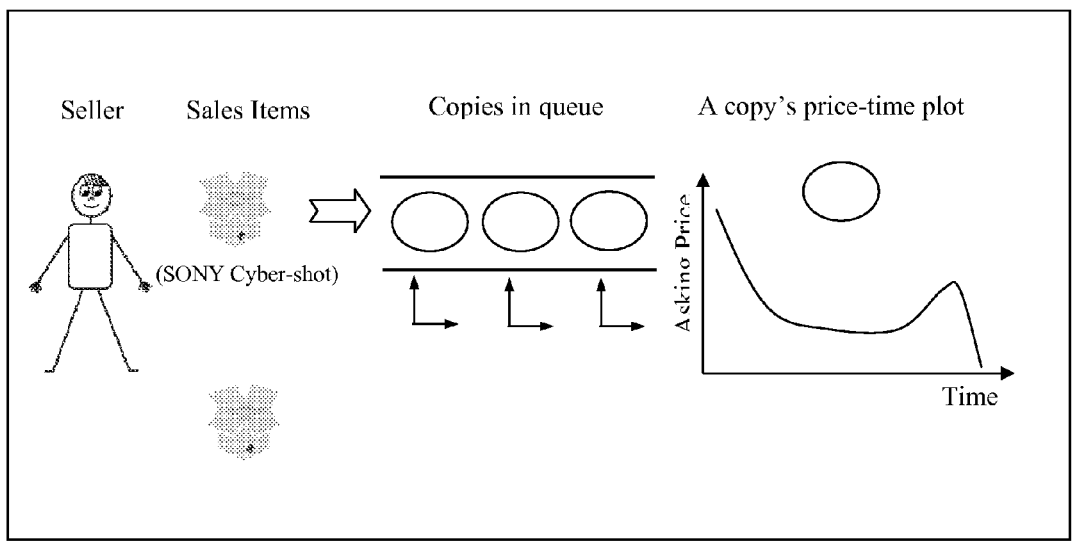
FIG. 19 depicts schematically a seller's price-time plot.

Referring to FIG. 19. A seller has multiple "sales items" (one sales item could be digital cameras of a particular make and model, SONY Cyber-shot, for example,), and each sales item have multiple copies (say the seller has 100 SONY Cyber-shot cameras for sale). The copies are conceptually arranged in a queue, where the copy at the leaving end of the queue is called "the current copy" for sale. The seller associates a "price-time plot" with each copy. Thus in general, two copies of one sales item might have different prices. Typically price in a price-time plot goes down over the time (thus over the time, the movement of prices could be seen as the same as a Dutch auction by the seller.) However, when there is a big demand, the price for a copy could go up. Further, it is true that in general, the price of a copy sold earlier fetches a higher price, but again it is not a necessity.

The relationship among a seller, a sales item, a copy, and a price-time plot describes a generalization from the coupons, rebates and other incentives available in daily commerce. Many times, a seller associates a same prime-time plot to multiple copies of a sales item. However, some times different copies have different price-time plots, as in the case when the seller has a discount sale. A further generalization is to design a price-time plot for each potential individual buyer. A key functionality that the system provides sellers is an easy way to assign such price-time plots to each copy and to each individual buyer.

Price-time plots is able to model commonly practiced pricing in daily commerce, some of which are as follows:
(1) Discounts;
(2) Buy one get one for free;
(3) Coupons
  (3.a) "x % within a range of dates", for example, "10% off, Jan. 6, 2007 to Jan. 12, 2007"
  (3.b) "15% off all you can fit in this shopping bag, good from Jan. 6, 2007 to Jan. 27, 2007"
(4) Mail-in rebates
(5) Multicast of deals is similar to coupon sheets that groceries send to an entire neighborhood via post mail;
(6) Uni-cast of deals: It is a more general case of a current practice, where a store limits a consumer to one coupon every month (e.g., Bed Bath and Beyond follows this procedure).
(7) "Club cards" offered by groceries or drugstores is a coarser version of the system's buyer's account:

(7.a) the consumer's pain is that she does not have prior knowledge regarding what's on sale at the store;

(7.b) with the system, the consumer logs on, types in items of purchase intention, and/or location(s), and applicable deals are displayed. The consumer then saves these deals before heading to stores.

(8) Rewards cards offered by radio stations, or even credit cards: the consumer pain with this practice is that consumers forget which stores (or hotels, etc.) offer rewards when the card is used;

The seller's goal is that, given a set of sales items, where each sales item has multiple copies, also given a fixed period of time, the total revenue, namely the double summation $\{\sum_{i \belong \text{all sales items}} \sum_{j \belong \text{all copies of } i} \text{price}(i,j)\}$, is maximized. The seller issues incentives in an effort to maximize the total revenue. A discount happens when (1) the seller lowers price on the price-time plot for a copy; (2) a buyer on his/her own initiative comes to the seller. A coupon or a rebate happens when (1) the seller creates a price-time plot for a copy; (2) the seller on its initiative sends to one or more buyers the price-time plot; (3) a buyer receives the price-time plot. Note, in general, the price-time plot for the copy is a favorable one to the buyer, namely the buyer gets a better price than buyers who do not have the price-time plot. The redemption of the coupon or rebate happens when the buyer makes a buy-sell transaction according to the price-time plot, or better yet for the buyer, at a price that's more favorable than the price-time plot suggests. A key difference between a coupon and a discount is that with the former, the seller initiates an action, and has a chance to select buyers from the general population of buyers who just "show up" at the seller. Another key difference is that with a coupon, a price-time plot can be designed for each individual buyer, whereas with a discount, this design cannot be done, since all buyers "show up" at the seller are supposed to get the same discount.

A buyer either comes to a seller, either on the seller's initiative, or on his/her own initiative. When a buyer redeems a coupon, the buy-sell transaction can trace its root back to a seller's initiative (as in issuing a coupon). With coupons, as it is well-known in the industry, a seller wants to accomplish three things: (a) expose new products to the buyer; (b) generate impulse purchases from the buyer; and (c) foster brand loyalty.

Figure 20:
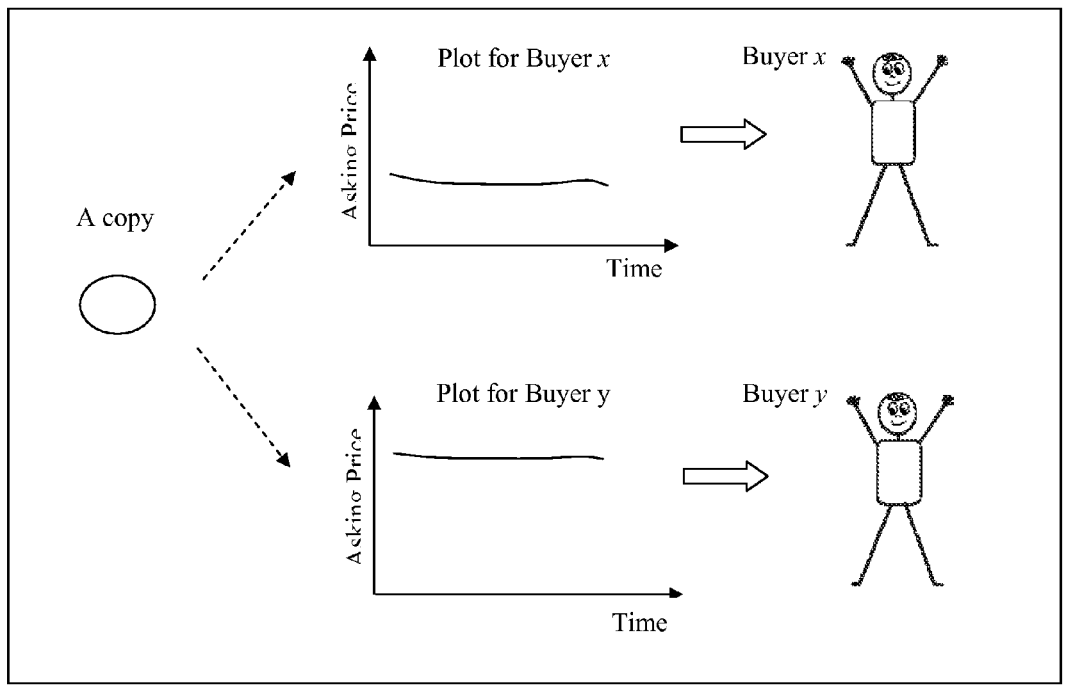
FIG. 20 depicts schematically seller-designed individualized price-time plots.

FIG. 20 depicts the relationship between price-time plots and multiple buyers, where different buyers are presented different price-time plots for a same copy of a sales item. This corresponds to the real world experience where a buyer with a coupon is granted a lower price than a buyer who does not have a coupon. In this case, a price-time plot is not only a function of copies, but also a function of buyers. When a buyer comes to a seller on her own initiative, the best the buyer can expect is a discount, either in the form of discount-for-everyone, or in the form of haggling with the seller.

With impulse buying, if a coupon is issued for a copy of sales item i, then impulse buying happens when (1) the buyer buys more than one copy of item i; and (2) the buyers buys copies of items other than i, and the purchase is done without a coupon.

Figure 21:
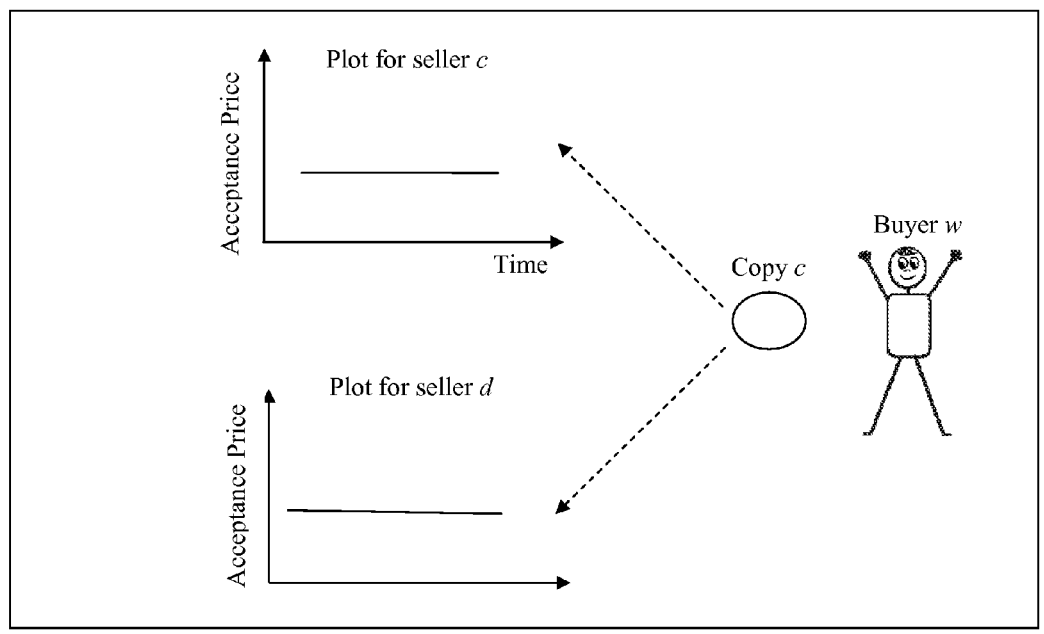
FIG. 21 depicts schematically how a buyer can register her "buying interest" using "acceptance price-time plots".

With exposure to new products, when the buyer is shown, and better yet, registers interest on, other sales items, as depicted in FIG. 21, where a buyer associates a plot of acceptance price vs time to a copy, and designs a plot for each seller.

The delivery of deals from sellers to consumers, and the delivery of buyer's intentions, is provided by the system. Such information is dynamically exposed and exchanged on the system between multiple (and probably numerous) sellers and numerous consumers.

The delivery, however, can be finessed and the system offers this functionality. Namely, an item being delivered could be "broadcast" which is the default way of delivering; it could also be "multi-cast" and "uni-cast". The latter two forms need the system to work with the owner of the item.

The system gets paid (typically by the store or by the manufacturer) when a deal is delivered (e.g., clicked) to a potential buyer. A consumer who owns a deal also accumulates value, to be paid by the system, when a deal is delivered.

For a consumer to use a deal, she's encouraged to log on as a registered user. Before a purchase, she first needs to "save" a deal of interest. This is necessary because (a) if the deal is broadcast or multi-cast, then she might be competing with others since by nature a store cannot offer unlimited quantities of an item; and (b) deals expire.

When doing purchasing, she's encouraged to purchase with a credit card associated with her account. The convenience to her is as follows: (1) if the purchase is online, by commencing the purchase from her account, all she needs is to give the online store her credit card number, and all deals that apply to her (some deals are broadcast, others multi-cast or even uni-cast) will be applied so she does not have to worry that a coupon or a rebate is missed; and (2) if the purchase is offline (as in with a grocery store or a drugstore), all coupons, discounts and other incentives that she has saved will apply automatically.

System 400 monitors redemption of coupons in the following way as contemplated:

(1) Get both the seller and the buyer involved, and separate distribution charge and the redemption value;

(1.a) The system gets paid for delivering a coupon: The seller agrees to pay the system $x when a coupon is "delivered" to a buyer. ("Delivered" could be "printed", or in any a verifiable way.) This is essentially the same as a click-through;

(2) The system gets paid when a coupon is redeemed (2.a) A buyer gets from the system $y when the system can verify that a coupon has been redeemed. To implement this, an easy way would be as follows: when the buyer redeems the coupon, she's asked to use the system's user interface to fill out some information. Once enough information is filled out, the buyer is then redirected to the seller's web site to finish the purchase. (There might be an alternative "high-tech" implementation based on private-public keys)

(2.b) The system on the strength of the information that a coupon has been redeemed, turns to the coupon issuer for collecting a fee of $z. (This is a lot like mail-in rebate, only that it is done electronically, and it is the system that pays the buyer, not the seller.)

Although not expressly claimed herein as originally filed, methods of conducting an on-line information site are contemplated comprising: publishing data on the site; where each of a first receiver and a second receiver differentially receiving the item at least partially as a function of the receiver's providing incentives; and differentially receiving a second data by the first receiver according to at least partially an incentive that's dependent on whether the provider is the first provider. All suitable time intervals between publishing the data and receiving data are contemplated, including for example no more that 1, 5, 10, 30, or 60 seconds. Also contemplated are independently (a) that the receiver can be authenticated by the site; (b) that data from a first publisher is received only by the first receiver; and (c) that a party can be a receiver at a first moment of time and a publisher at a second moment, which moments can be the same or almost the same points in time. The data would typically comprise specification details of a product/service, of multiple separate products/services, or even of combinations of products/services.

Contemplated methods of conducting an on-line information site for searching of timed data can also advantageously comprise: obtaining data from providers; taking a query from a searcher; matching the query with data; ranking the matched data; and displaying the ranked data. In such cases the step of displaying can further comprise at least three areas, one for past data, one for current data, and one for future data. The first and second data can be considered similar in essence, or merely related, or as expressly bundled. Sets of bundled data might or might not be considered as similar in essence. As discussed above, the first data can comprise a price of at least one of goods and services, and/or specifications for at least one of goods and services.

Various user interactions are also contemplated. For example, where a first data belongs to the matched data, the user can be prompted regarding the second data. Also, searchers (who might or might not be authenticated by the site), could be allowed to chose either the displayed data or a site displaying a jump page. Jump pages can: (a) comprise data related to the chosen data; (b) comprise data as deemed by the site as related to the chosen data; (c) be at least partially dependent on the identity or other characteristic of the user. Searchers can use the system in any suitable manner, including for example forwarding the first data to another party, and purchasing a good/service associated with the first data. The site might even provide software for a searcher to organize good purchased or to be purchased, and perhaps accumulate value for the searcher, where the values are decided at least partially dependent on the number of actions, and/or are decided at least partially dependent on to which party the forwarding is done. A publication site could choose to display identities or other information regarding searchers whose values are the highest during a time period.

Still further, contemplated methods include, independently: the site purchasing unwanted goods from a searcher; a first provider representing a vendor web site; ranking of a first data and a second data comprising factors related to previous actions of searchers on each of the data; actions of a searcher including comprises clicking on the first data.

Methods of scoring both a plurality of voters and a plurality of items being voted on are also contemplated, which include: obtaining votes each voter assigns to each item being voted; assigning a score to each item being voted on based on which voters cast vote on the item; and assigning a score on which voter based on what items the voter votes. Such methods could further comprise one or more of: iterating the steps of assigning scores to voters and assigning scores to items; ranking voters at least partially based on the scores assigned to the voters; ranking the items being voted on at least partially based on the scores assigned to the items being voted on; using a matrix to store the votes for at least some voters for the first item being voted; using the matrix to store the votes for at least some voters for the second item being voted; computing an eigenvector of the matrix; and using a matrix dot product as a measure of the similarity of the matrix with a second matrix.

It is expressly contemplated that voters can include online shoppers, and that the items being voted on comprises a shopping deal. It is also contemplated that a vote could comprise the action of accepting a deal, and/or forwarding the information of deal by a shopper to another party. The item being voted on could comprise a product design.

Thus, specific embodiments and applications for freshness and completeness of information and related improvements have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of publishing, comprising:
    providing a publication site server configured to store and to publish first time-sensitive data from a first data provider and second time-sensitive data pushed from a second data provider;
    the publication site server conducting an auction, and incorporating auction results into at least one of an update fee schedule and a gathering fee schedule;
    the publication site server differentially updating the first and second data (1) according to the update fee schedule indicating when updating should occur in exchange for which update fee, (2) according to the gathering fee schedule indicating when first and second websites of the first and second data providers should be crawled in exchange for which gathering fee; and (3) in response to receiving at least one of the fees from at least one of the first and the second data providers; and
    providing a user interface configured to allow the publication site server to present the updated first and second data.

2. The method of claim 1, wherein the update fee schedule provides for updating the first data at least daily.

3. The method of claim 1, wherein the update fee schedule provides for updating the first data at least hourly.

4. The method of claim 1, wherein the update fee schedule associates the first and second data with first and second update delays, respectively.

5. The method of claim 1, wherein the update fee schedule associates the first and second data with first and second update queues, respectively.

6. The method of claim 1, wherein the gathering fee schedule provides for differential delays in crawling first and second websites of the first and second data providers, respectively.

7. The method of claim 1, wherein the gathering fee schedule provides for differential delays in crawling a first and second portions of a website.

8. The method of claim 1, further comprising obtaining additional data representing updates of the first data for publication on the publication site by action of a human digger not associated with either of the data providers.

9. The method of claim 8, wherein the additional data comprises a correction to the first data.

10. The method of claim 1, further comprising allowing a consumer to search for goods and services and to compare prices of the goods and services via the publication site server.

11. The method of claim 1, further comprising including price information of at least one of goods and services in each of the first and the second data.

12. The method of claim 1, further comprising including price information of items within a bundled combination in the first and the second data.

13. The method of claim 1, further comprising storing price information for at least 10,000 items where the first and the second data comprises at least a portion of the price information.

14. The method of claim 1, further comprising offering a coupon, where the first data comprises the coupon.

15. The method of claim 1, wherein the step of providing the publication site server includes the server presenting the user interface selected from the group consisting of a website, a bulletin board, a forum, and a blog.

16. The method of claim 1, wherein the auction results in the fees within at least one of the update and the gathering fee schedule.

17. The method of claim 16, wherein the auction involves associating the first and second data with first and second update delays within the update fee schedule, respectively.

18. The method of claim 16, wherein the auction involves associating differential delays of the gathering fee schedule with crawling first and second websites related to the first and second data, respectively.

19. The method of claim 16, wherein the auction is operated in a partially blind manner to establish a position within at least one of the fee schedules.

* * * * *